United States Patent
Licata

(10) Patent No.: US 7,178,763 B2
(45) Date of Patent: Feb. 20, 2007

(54) PASSIVE DEPLOYMENT MECHANISM FOR SPACE TETHERS

(75) Inventor: Renato Licata, Turin (IT)

(73) Assignee: Alenia Spazio S.p.A., Rome (IT)

( * ) Notice: Subject to any disclaimer, the term of this patent is extended or adjusted under 35 U.S.C. 154(b) by 69 days.

(21) Appl. No.: 10/538,703

(22) PCT Filed: Nov. 18, 2004

(86) PCT No.: PCT/IT2004/000638

§ 371 (c)(1),
(2), (4) Date: Jun. 10, 2005

(87) PCT Pub. No.: WO2005/090162

PCT Pub. Date: Sep. 29, 2005

(65) Prior Publication Data

US 2006/0060716 A1    Mar. 23, 2006

(30) Foreign Application Priority Data

Mar. 24, 2004  (IT) ........................ RM2004A0153

(51) Int. Cl.
*B64G 1/22* (2006.01)

(52) U.S. Cl. .................................. 244/158.2; 244/167

(58) Field of Classification Search ............ 244/158.2, 244/167, 173.7, 159.4; 242/419.6, 129; 188/65.1
See application file for complete search history.

(56) References Cited

U.S. PATENT DOCUMENTS

| 3,478,986 A | * | 11/1969 | Fogarty | .................. | 244/159.4 |
| 3,532,298 A | * | 10/1970 | Swet | .......................... | 244/167 |
| 3,582,016 A | * | 6/1971 | Sherman | ..................... | 244/167 |
| 4,181,062 A | * | 1/1980 | Bernstein et al. | ............ | 89/1.57 |
| 4,506,852 A | * | 3/1985 | Adams et al. | ........... | 244/173.3 |

* cited by examiner

*Primary Examiner*—Galen Barefoot
(74) *Attorney, Agent, or Firm*—Andrew Wilford

(57) ABSTRACT

Mechanism for passively deploying expendable space tethers on orbit, by means of an initial separation impulse only, provided by a simple spring system that is part of the mechanism itself. The passive deployment of the space tether and a tethered end-mass is provided by the particular mechanism devised, having very low deployment friction and resistance. Tether deployment brake towards the final part of deployment is produced by a daisy-like brake, stored within the winding of the fixed tether spool so that it is automatically deployed (opened) and starts its deployment braking or resistance function from a planned point of the tether deployment in space.

3 Claims, 4 Drawing Sheets

PASSIVE DEPLOYMENT MECHANISM FOR SPACE TETHERS

CROSS REFERENCE TO RELATED APPLICATIONS

This application is the US national phase of PCT application PCT/IT2004/000638 filed 18 Nov. 2004 with a claim to the priority of Italian patent application RM2004A000153 itself filed 24 Mar. 2004.

BACKGROUND OF THE INVENTION

1. Field of the Invention

The present invention relates to the field of the mechanisms for deployment of space tethers from earth orbiting spacecraft or satellite carriers and in particular to the class of expendable tether mechanisms for passive on orbit deployment of end-masses tethered by a long space tether and that do not require to be retrieved. Tethers many kilometres in length, to be stored by winding up onto the present mechanism, may be either conductive, usually made of copper or aluminium, or non-conductive, such as those made of Kevlar, Spectra, glass fibre, quartz fibre, etc. depending on the space tether application.

One of the most important issues for an application requiring a tether many kilometres in length is the on-orbit deployment (and retrieval) operation, since unless the orbiting tethered masses have a difference in orbiting altitude of some kilometres (measured along the local vertical direction), the connecting tether will not have sufficient tension or separating force (due to the difference of the gravity gradients associated with the two end-masses) to allow a passive tether deployment. This means that the tether passive deployment will only be possible if the friction force of the tether deployment (within the tether mechanism) is smaller than the tension force along the tether, due to the effect of the Earth gravitational field onto the tethered masses.

Low friction for a tether deployment mechanism is therefore very important, in particular in order to allow a passive deployment and control for conductive or non-conductive space tether applications, such as electro-dynamic propulsion for orbit raising or maintenance, de-orbiting of a spacecraft at the end of its operational life-time, and other non-conductive tether applications.

The field of application of the present invention is therefore the deployment mechanisms for space tethers, having a very low early deployment friction or resistance, in order to allow passive deployment of a tethered mass with only the application of an initial and rather small separation impulse provided by a spring separation mechanism or a similar space separation device.

2. Description of the Prior Art

Conductive tethers may be used to provide propulsion for orbital adjustment. It is a simple fact of physics that a current flowing through a conductor creates a magnetic field. If a satellite sends current generated by its solar arrays through a conductive tether, the direction of the current may be such as to generate a magnetic field in the opposite direction with respect to the Earth's magnetic field, with consequent magnetic "drag" which degrades the satellite orbit. If the satellite sends the current through the conductive tether in the opposite direction, it generates a magnetic field which works with the Earth's magnetic field, and the satellite orbit will rise.

An important application for the type of passive deployer disclosed here is a Low Earth Orbit (LEO) satellite carrier or a launcher last stage equipped with a de-orbiting device having several-kilometre long and conductive tether and a passive deployer of the type here described and illustrated in FIG. 1 (reflecting the state of the art), with its protective cover 1 mounted on an exterior spacecraft panel 2 by means of three pyro-bolts 3.

This de-orbiting device represents a state-of-the-art electro-dynamic tether system for de-orbiting of small and medium size LEO satellites and upper stages of launchers. Analyses show that the use of tethers for orbital adjustment is far more efficient in terms of spacecraft mass requirements than the use of chemical thrusters, though the orbital changes are also slow. Current studies indicate that a 25-kilogram tether deployed by a 1500-kilogram satellite in an 850-kilometre high orbit can bring the satellite back to Earth in three months.

A reference to this type of space tether application is given by the following conference papers:

1. "EDOARD: A Tethered Device for Efficient Electrodynamic De-Orbiting of LEO Spacecraft", presented at the Space Technologies & Applications International Forum (STAIF 2001), Conference on Innovative Transportation Systems, Albuquerque, N. Mex., USA, Feb. 11–15, 2001, by Licata R., Iess L., Bruno C., and Bussolino L.

2. "EDOARD: An Electro-dynamic Tether Device for Efficient Spacecraft De-Orbiting", presented at the 3$^{rd}$ European Conference on Space Debris, Vol. 2, Darmstad, Germany, Mar. 19–21, 2001 by Licata R., Iess L., Bruno C., Bussolino L., Anselmo L., Schirone L., and Somesi L.

In these published papers, presented by the present inventor and other authors, only the electro-dynamic tether application for space has been described and illustrated. The tether deployment mechanism and method of tether deployment, which form the subject of the present patent application, have been neither published nor disclosed before.

The inventor is also aware of the following space tether deployment mechanism concepts and associated publication references, which however have not the same or similar design nor do thy present the same characteristics of the deployment mechanism and passive deployment method disclosed here. These other tether deployment mechanisms, for similar space applications are described in the following conference papers or journal articles:

3. Caroll, J. A., "SEDS Deployer Design and Flight Performance", AIAA Paper 93-4764, 1993. whose mechanism was used in the NASA Missions SEDS-1 in 1993 and SEDS-2 in 1994. In SEDS-1, a 25-Kilogram mini-satellite was deployed down towards the Earth. In 1994, the SEDS-2 experiment was performed with the same gear as SEDS-1, deploying a 20-Kilometre long tether.

4. Koss, Stephen, "Tether Deployment Mechanism for the Advanced Tether Experiment (ATEX)", 7$^{th}$ European Space Mechanism and Tribology Symposium, p. 175–182, European Space Agency, Noordwijk, The Netherlands, 1997.

5. Licata, R. Gavira, J. M. Vysokanov, V. Bracciaferri, F., "SESDE—A First European Tether Experiment Mission", IAF-paper-98-A709, 49$^{th}$ International Astronautical Congress, Melbourne, Australia, 1998, in which the Small Expendable Spool Deployer (SESDE) concept is illustrated.

6. Nakamura, Yosuke, "Ground Experiments of a Micro Tether Reeling Mechanism", 23$^{rd}$ Intern. Symposium on Space Technology and Science, p. 887–892, Matsue, Japan, May 2002.

None of these tether mechanisms has the characteristics or advantages of the mechanism and deployment method disclosed here, which allow the deployment of a full passive space tether from an orbiting spacecraft carrier, starting from the early stage of deployment, when gravity gradient tensions are still very low.

The SEDS deployer design presented in Ref. 3. and being used in some space tether applications such as the SEDS missions, although it also implements tether storage or winding of the fixed spool type, similar to the one indicated in the present patent application, has in its outlet position a "barber pole" tether deployment brake, comprising a motor to rotate the "pole" onto which the tether is also wound on. The number of spirals on the "pole" of tether winding is controlled by the electrical motor and these make the tether deployment friction force used for its deployment brake varying. Consequently, even with its minimum winding of tether spirals onto the "barber pole" during early tether deployment phases, some high residual tether deployment friction force is always present in this type of mechanism, making very difficult if not impossible an early stage passive space tether deployment performance, as that which can be obtained by the mechanism disclosed in the present application.

On the other hand, the ATEX mechanism indicated in Ref. 4. above, is not designed for cable tether but for tape tether, with tether reel and motor and hence very high deployment friction force and rather strong mechanical complications, not at all present in the mechanism described in the present application.

The "Advanced Tether Experiment" (ATEX) in early 1999 was an element of a satellite named the "Space Test Experiment" (STEX), that tested a suite of new technologies for future NRO intelligence or support satellites. ATEX was intended to test a new tether scheme that was implemented as a tape over six-kilometre long and three-centimetre wide, with reinforcements consisting of fibre strands running down its length. However, the experiment was a complete failure, with only 22 meters of the tether being successfully deployed before STEX determined an out-of-bounds condition with tether deployment. STEX ejected the ATEX package to protect itself. The ATEX mechanism comprises a stepper motor driving a pair of pinch rollers pulling the tether off a level-wound reel.

The SESDE mechanism design, illustrated and published in Ref. 5, is also based on the tether winding of fixed spool type, but it does not possess the very low friction device, represented by the single tether layer cylindrical part for the early tether deployment, which is practically friction-less, the simple incorporated spring separation device and the passive tether deployment brake device of the tether mechanism disclosed in the present application.

Finally, the tether mechanism of Ref. 6 is not at all similar to the mechanism of the present patent application, since it implements a rotating reel for its tether storage and winding, with the consequence of requiring a reel motor and brake and other associated electromechanical complexities, in order to overcome high friction forces due to tether unwinding, reel shaft rotational friction force and torque, etc.

OBJECTS OF THE INVENTION

The main object of the present invention is to provide an expendable space tether deployment mechanism capable of passively deploying cable tethers made of various materials and long up to many kilometres (e.g. 20–30 Km) with very low friction force at the early stage of deployment, an incorporated impulsive separation device for the required tethered end-mass with minimum complexity. The tether structure (i.e. diameter, layers and materials) and length required by the specific application will determine the overall mechanism sizing, including fixed spool and external cylinder sizing, separation spring sizing etc.

The tether deployment mechanism proposed in the present patent application may be mounted onto any external flat surface of a spacecraft, as shown in FIG. 2, with external cover 1, mechanical interfaces, including some (usually three) pyro-bolts 3 to be actuated for an impulsive separation to initiate the tether deployment, data and power interfaces with the carrier spacecraft by the cables 4 and the connectors 5 also shown in the same figure.

The space tether mechanism disclosed here attains the object indicated above through the implementation of the following main mechanism features illustrated in the cross section drawing of FIG. 3:

a cylinder 6 onto which a first layer of some hundreds of meters of tether length 7 is wound-up, providing hence the very low friction or resistance force for the early part of the space tether deployment operation;

a fixed cylindrical tether spool 8, representing the deployer-storing device for the remaining kilometres of tether length. Continuity of the tether winding (and deployment) from the first part on the mechanism external cylindrical surface 6 and its interior tether spool 8 is allowed by a longitudinal cut 9 made along the external cylinder length, having a width of only a few millimetres (depending upon the tether diameter size) but sufficient to allow the tether passage at the end of the first part of the deployment and the starting of the internal tether spool deployment;

a spring separation mechanism, represented by the centrally mounted spring 10 on the interior interface plane 11 and the (three) pyro-bolts 3, used for installing the deployer cover 1 onto the carrier satellite structure 2 and also for separating these deployer parts on orbit with a deployment time command sent through the carrier spacecraft;

a passive tether spool deployment brake 12, able to passively start its activation during the last part of tether deployment. This is implemented in the tether spool winding by a device of daisy shape that opens up or deploys when freed by the space tether unwinding, as soon as it reaches the planned deployed tether length or tether spool level, as illustrated in the same FIG. 3.

A further object of the present invention is to provide a method for the passive deployment of a tether by means of the mechanism cited above. This method is described below and is also detailed in the characterising part of claim 3.

DESCRIPTION OF THE PREFERRED EMBODIMENTS

Figure 1:
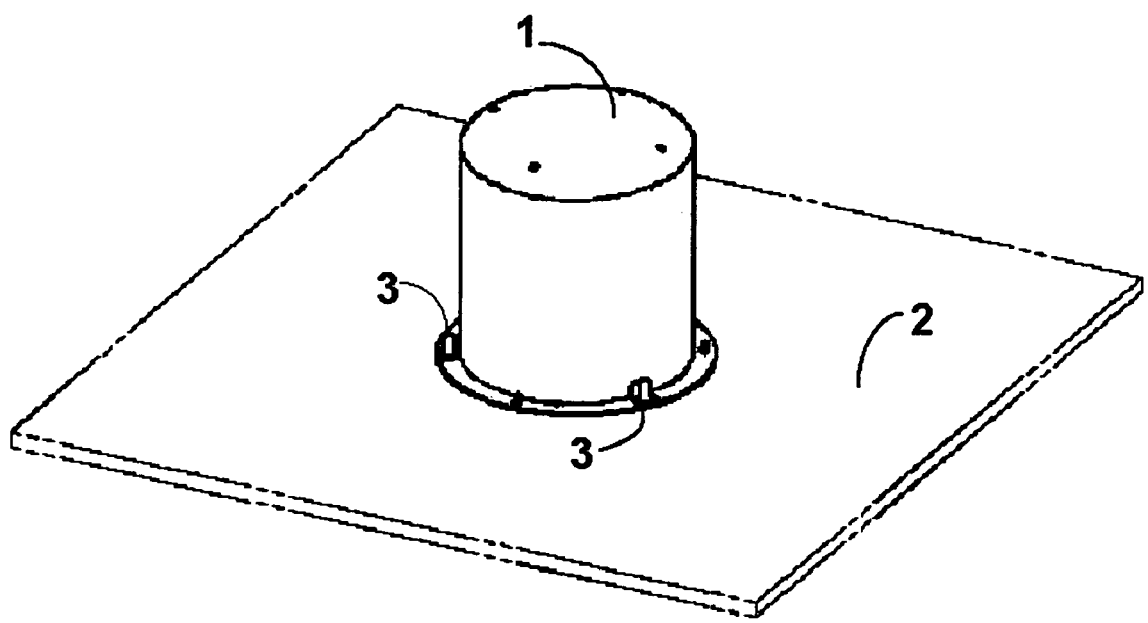
FIG. 1, reflecting the state of the art space tether mechanism, with its protective cover mounted on an exterior spacecraft.
Figure 2:
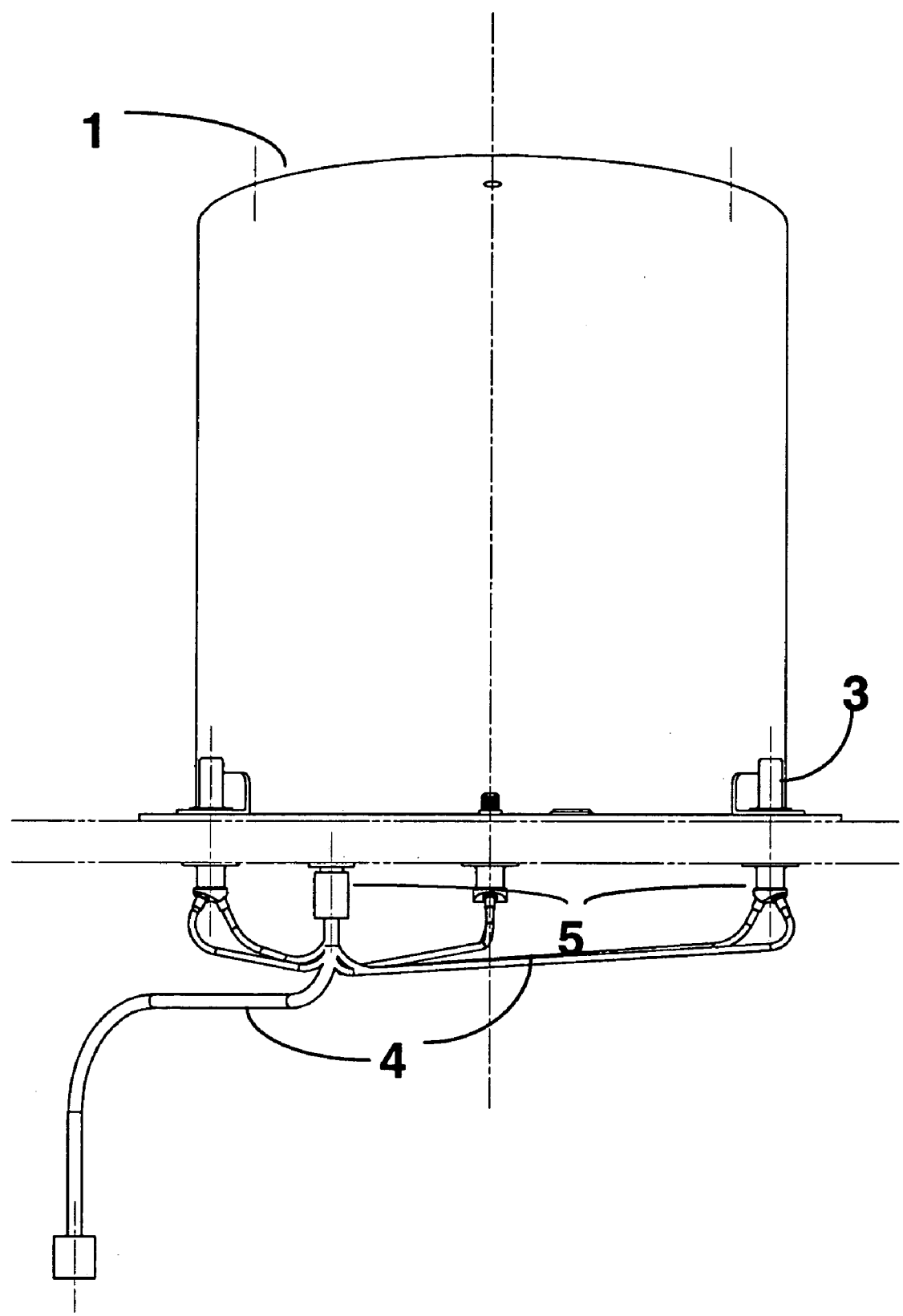
FIG. 2, the tether deployment mechanism proposed in the present patent application mounted onto an external flat surface of a spacecraft, FIG. 3, the cross section drawing of the tether deployment mechanism proposed in the present patent application.

The mechanism described here may be fitted onto a satellite bus with minimum mass, complexity and cost, as it limits the number of tether deployment mechanism components to a minimum, while minimising the risk of failure. Minimum electrical and mechanical or structural interfaces are required, as also shown in FIGS. 2 and 4.

Figure 3:
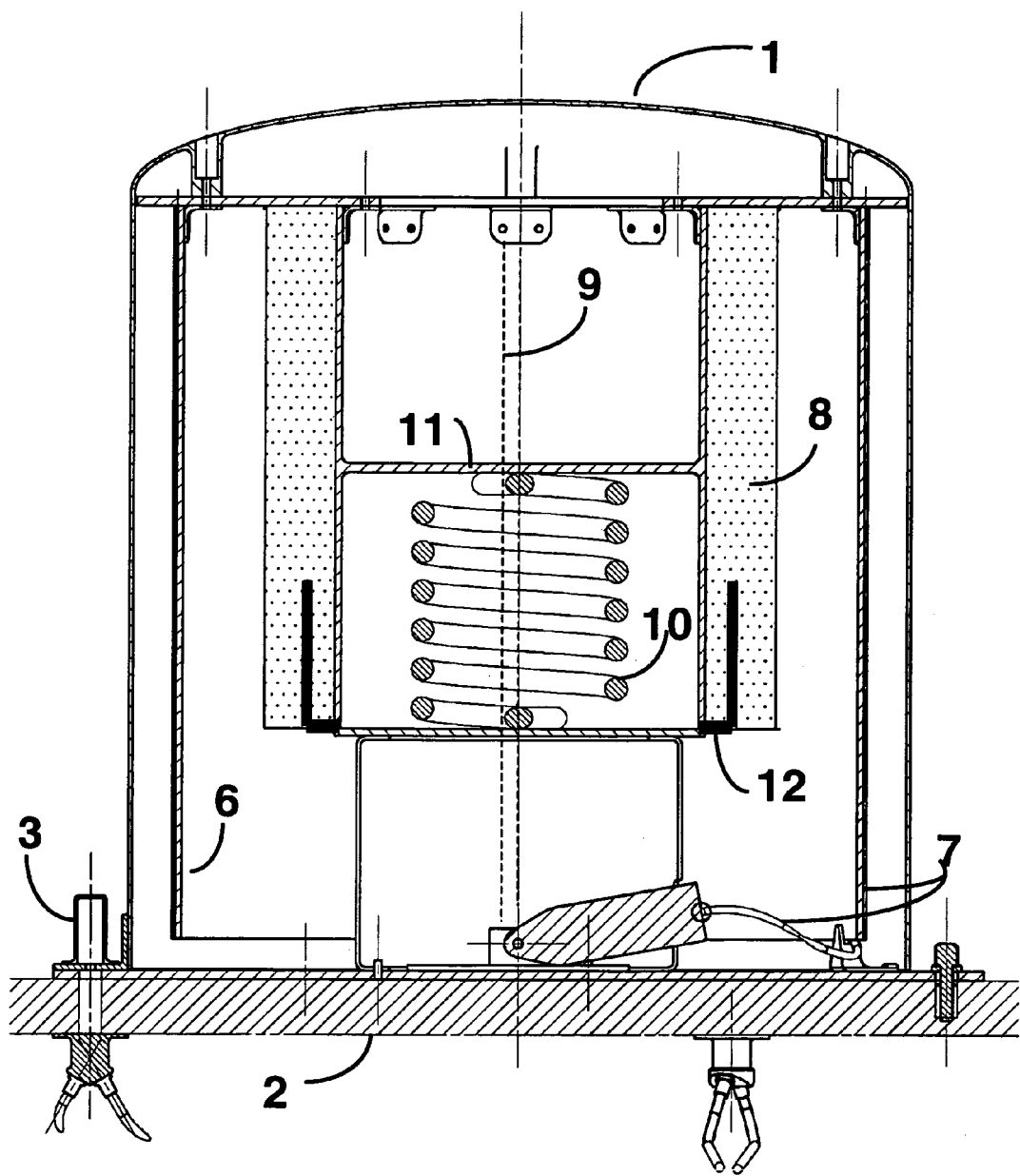

In the mechanism described here, the impulse for the separation and starting of the on-orbit tether deployment is provided by a simple system illustrated in FIG. 3, with a spring 10 accommodated at the centre of the fixed tether spool 8 and attached to it by a mechanical interface plane 11. When the deployer cover 1 is freed by the simultaneous actuation of the (three) pyro-bolts 3 through a suitable ground command, the central separation spring is freed at one end and hence imparts the planned impulse to the tethered deployer mass and transforms its stored energy in form of kinetic energy of the tethered masses.

Figure 4:
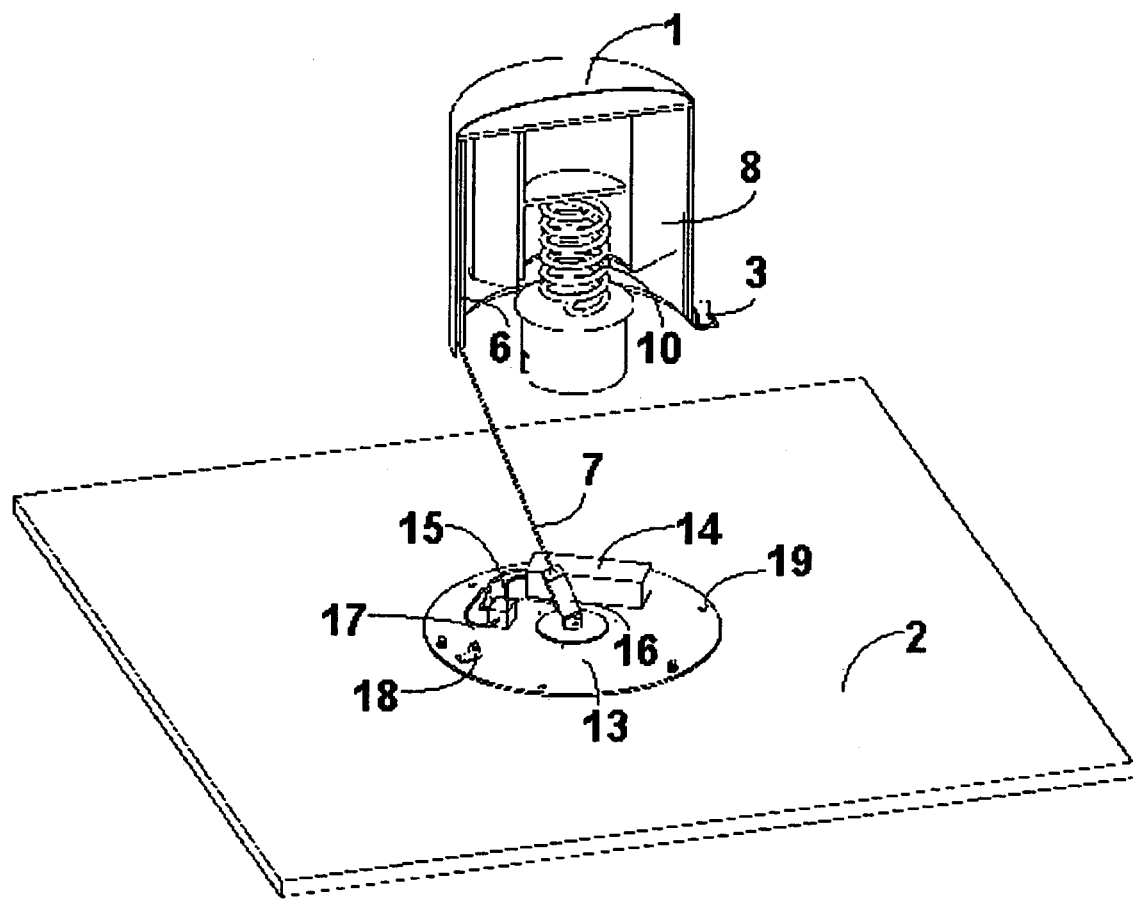
FIG. 4, the tether deployment mechanism proposed in the present patent application in the deploying mode.

As shown in FIG. 4, after the actuation of the pyro-bolts 3 and spring system 10, the first portion of tether 7, wound-up onto the outer mechanism cylinder 6, will start deploying the mechanism part with tether spool 8, the deployer cover 1 and the spring system 10 will separate from the carrier spacecraft 2 onto which the deployer interface plane 13 and the electronics boxes, comprising the hollow cathode 14 and the controller 15, the tether attachment point with its three-axis magnetometer 16, together with data and power interfaces 17 will remain attached.

Therefore during the on-ground preparation activity, the many-kilometre long conductive tether is hence wound-up firstly onto the inner cylindrical spool 8 and hence onto the outer cylinder 6 with nearly zero early tether deployment friction (having only one single layer of tether winding on the exterior cylinder 6) and thus providing a passive deployment after a small initial separation impulse.

After on-ground assembling of the tether mechanism, during installation activity on the carrier vehicle and ground and space transportation, the outer tether winding tension is kept by a simple V-shaped device 18, mounted on an interface plane 13 that is installed onto the carrier spacecraft by (usually) three bolts 19, as shown in FIG. 4.

Once the on-orbit deployment of the first part of tether length is completed, the tether will deploy passing through the cut 9 of the external cylinder illustrated in FIG. 3, and then the fixed spool tether will start deploying with higher deployment friction or resistance with respect to the earlier part of the deployment.

Depending on the tethered masses, the deployed tether length and also the initial separation rate and friction values, at some stage of the many-kilometre long deployment, when the differential gradient applied to the tethered masses in the earth gravitational field is sufficiently high, the tether deployment rate will start gradually increasing. Unless some higher deployment resistance or friction force is applied, the deployment rate could reach so high values as ten or more metres per second in case of very long deployments. In any case, before the end of the deployment, in order to limit the maximum value of deployment rate during operations and even decrease it in its last part of deployment, a braking device 12 has been introduced in the tether spool winding so that it is freed to deploy as a daisy and providing high friction, hence high tether deployment resistance, for the remaining part of the space tether to be deployed.

What is claimed is:

1. A deployment mechanism for expendable space tether applications comprising essentially a fixed single-layer tether winding cylinder (6), a multiple-layer tether winding central spool (8), an initial separation impulse mechanism (10) for passive tether deployment, and a tether deployment brake (12) of daisy-like shape; characterized in that said mechanism accommodates a first portion of tether (7), many kilometers in length, wound up on said inner multi-layer spool (8), followed by a second portion of said tether (7), many hundred meters in length, wound up in a single layer on said outer cylinder (6), in order to allow the passage of the tether (7) both on ground, during the required tether winding and preparatory operations, and on-orbit, during the actual deployment by the unwinding of its two types of tether windings, a surface cut (9) of said outer cylinder (6) of sufficient width and along most of its length is provided, in this way once the continuous space tether is deployed on orbit, the unwinding tether will pass through said cylinder cut (9) and will continue to unwind from said multi-layer central spool (8) till the end of deployment; said initial separation impulse mechanism for passive tether deployment comprises a central sinusoidal spring (10), mounted inside the core of said fixed multi-layer tether spool (8) and capable of storing the required energy for initial separation of the tethered masses; said separation spring (10) is kept in a compressed state, during ground operations and ground and space transportation and before on-orbit separation and deployment, by some, usually three, pyro-bolts (3) mounted on the mechanism cover (1) and its interface plane with the external surface (2) of the carrier spacecraft; at separation time, on command coming from ground through the carrier spacecraft telemetry and telecommand on-board system, said pyro-bolts (3) are actuated, said central spring (10) is released and the whole deployment mechanism, with its cover (1), spring (10) and full tether windings, will separate about the orbit local vertical direction from said carder spacecraft (2);

and said passive tether deployment brake (12) of daisy-like shape and flexible material, incorporated within said centrally fixed multi-layer spool tether winding (8) and fixed on the spool central core mounting, will deploy On-orbit during tether deployment operation at the planned length of the deployed tether or distance of the tethered end-masses; the deployment of this device increases by the planned magnitude or amount the tether deployment friction resistance force, so that the decreasing of the tether deployment rate from the deployer mechanism is gradually provided and applied until the end of the deployment operation.

2. The deployment mechanism claimed in claim 1, further comprising a tether mechanism interface plane (13), to be bolted onto said external surface (2) of the carrier spacecraft, an external protective cover (1) bolted by said pyro-bolts (3) to said interface plane (2) with the carder spacecraft, mountings of the carrier-end tether attachment (16), electronic boxes (17), data and power interface connectors (5), and an outer tether winding V-shaped gripping or restraining device (18); characterized in that said tether mechanism interface plane (13) is bolted to an external surface (2) of said carder spacecraft by substantially three simple bolts (19) and remains mounted onto the external surface of the carder, with electronics and other components of the deployment device, after on-orbit initial separation of the deployer mechanism and deployment operations of the tether and the tethered end-masses; in that said external protective cover (1) bounded by said pyro-bolts (3) to the interface plane (13) with said carder spacecraft is b01tedas a single structure to said tether winding spool (8) structures with said spring separation device (10) incorporated; said cover (1) is also used as a protective shell, for the tether windings and all the other deployer mechanism components, mainly against potential micro-meteorite impacts and the material aging effects due to ultra-violet ray exposure or to exposure to other types of dangerous space radiation;

said mountings of the attachment point of the tether end at the carder spacecraft side, said electronics boxes (17) and said data and power interface connectors (5) of the tether application system, such as for the electro-dynamic tether propulsion application, and said V-shaped outer tether winding restraining or gripping device (18) are all mounted to be fixed and to remain on the mechanism interface plane, on the exterior of the carrier spacecraft until the end of the space tether application; the carrier spacecraft bound electronics components for the electro-dynamic tether application are represented by a hollow cathode (14), relays and current measurement and control electronics (15); and said V-shaped tether winding gripping device (18) is of elastic (beam) type and its mounting on the interface plane is in correspondence of said outer tether winding cylinder (6) end-border, so that the first few single layer tether winding spirals are gripped to the cylinder surface and the tether winding tension kept until on-orbit deployment separation action for which these tether winding spirals and cylinder are freed from said V-shaped restraining device (18).

3. A passive method for tether unwinding, based on the mechanism claimed in claim 1, characterized in that said tether unwinding comprises the following steps: an impulse applied for separation from said spacecraft (2) performed by said spring (10); tether unwinding from said single-layer cylindrical outer spool (6), involving a first tether length of many hundred meters with tether deployment resistance or friction force of value nearly equal to zero; further tether unwinding from said multi-layer spool (8), located inside said outer single-layer spool (6) of the remaining portion of the many kilometers long tether; and tether deployment braking action resulting from a constant friction force applied by means of said brake (12), through which said tether (7) is made to pass.

* * * * *